(12) United States Patent
Waung et al.

(10) Patent No.: US 8,249,499 B2
(45) Date of Patent: Aug. 21, 2012

(54) METHOD, SYSTEM AND DEVICE FOR INITIATING WIRELESS COMMUNICATION

(75) Inventors: William Yih Yuan Waung, Burnaby (CA); Matthew Thomas Waung, Burnaby (CA)

(73) Assignee: Sierra Wireless, Inc., Richmond, BC (CA)

( * ) Notice: Subject to any disclaimer, the term of this patent is extended or adjusted under 35 U.S.C. 154(b) by 448 days.

(21) Appl. No.: 12/533,884

(22) Filed: Jul. 31, 2009

(65) Prior Publication Data

US 2011/0028085 A1   Feb. 3, 2011

(51) Int. Cl.
*H04B 7/14* (2006.01)
(52) U.S. Cl. ....... 455/7; 455/11.1; 455/41.2; 455/552.1; 370/315; 370/252
(58) Field of Classification Search ............. 455/7, 11.1, 455/13.1, 15, 67.11, 436, 405, 553.1, 556.1, 455/517, 16, 73, 435.1, 63.1, 41.2, 552.1; 709/227; 730/237, 252, 338, 329, 315, 349, 730/309, 350, 401, 473, 241; 714/750; 370/237, 370/252, 338, 329, 315, 349, 309, 350, 401, 370/473, 241
See application file for complete search history.

(56) References Cited

U.S. PATENT DOCUMENTS

| | | | |
|---|---|---|---|
| 2002/0028655 A1* | 3/2002 | Rosener et al. ................ | 455/16 |
| 2006/0234725 A1 | 10/2006 | Litwin | |
| 2007/0014292 A1 | 1/2007 | Obata | |
| 2007/0032225 A1 | 2/2007 | Konicek et al. | |
| 2007/0135151 A1* | 6/2007 | Dendy ........................... | 455/517 |
| 2007/0153986 A1* | 7/2007 | Bloebaum et al. .............. | 379/45 |
| 2007/0167149 A1* | 7/2007 | Comstock et al. ............ | 455/405 |
| 2007/0268876 A1* | 11/2007 | Yellin et al. .................... | 370/338 |
| 2008/0032738 A1* | 2/2008 | Boyer et al. ................ | 455/556.1 |
| 2008/0057912 A1 | 3/2008 | Deprun | |
| 2008/0058031 A1 | 3/2008 | Deprun | |
| 2008/0102787 A1 | 5/2008 | Landschaft et al. | |
| 2008/0227386 A1* | 9/2008 | Dayal et al. ...................... | 455/7 |

(Continued)

FOREIGN PATENT DOCUMENTS

EP   1777894 A2   4/2007

(Continued)

OTHER PUBLICATIONS

Dial-up internet connection via bluetooth and mobile phone, Discussion Forum, Tom's Hardware Guide, http://www.tomshardware.com/forum/24913-dial-internet-connection-bluetooth-mobile-phone, Mar. 23, 2009.

(Continued)

*Primary Examiner* — Tan Trinh
(74) *Attorney, Agent, or Firm* — Holland & Hart LLP (57) ABSTRACT

The present invention provides a wireless device configured relay wireless communication between a computing device and one or more broadband wireless networks. In this manner the wireless device can act as an access point, hotspot or the like, for the computing device. The wireless device comprises a network interface system configured for communication with a wireless network and one or more broadband wireless networks. The wireless device further includes a control system operatively coupled to the network interface system, wherein the control system is configured to control communication between the network interface system and the wireless network. The control system is further configured to activate communication with one or more of the broadband wireless networks upon receipt of a predetermined communication from the computing device via the wireless network.

25 Claims, 4 Drawing Sheets

U.S. PATENT DOCUMENTS

| | | | |
|---|---|---|---|
| 2008/0305792 A1* | 12/2008 | Khetawat et al. | 455/435.1 |
| 2009/0068985 A1* | 3/2009 | Nguyen et al. | 455/411 |
| 2009/0180448 A1* | 7/2009 | Kobayashi | 370/338 |
| 2010/0062802 A1* | 3/2010 | Amram | 455/556.1 |
| 2010/0167743 A1* | 7/2010 | Palanki et al. | 455/436 |
| 2011/0010458 A1* | 1/2011 | Das et al. | 709/227 |
| 2011/0143673 A1* | 6/2011 | Landesman et al. | 455/63.1 |
| 2011/0228677 A1* | 9/2011 | Weigand | 370/237 |

FOREIGN PATENT DOCUMENTS

| | | |
|---|---|---|
| JP | 2004260258 A | 9/2004 |
| WO | 2006095512 A1 | 9/2006 |

OTHER PUBLICATIONS

"Ted's Bluetooth Guide for Pocket PC Devices," Aximsite.com-The Dell Axim Community, http://www.aximsite.com/bluetooth/bt_guide5.htm#section 13, Mar. 13, 2009.

"Walking Hotspot," Discussion Forum, Geekzone, http://www.geekzone.co.zn/forums.asp?ForumID=66&TopicID=21361, Mar. 23, 2009.

Unleashing the Power of the Mobile Web—walkinghotsport TM Whitepaper, Joikusoft OY Ltd., 2008.

"Scenarios for Network Composition in Ambient Networks: a new paradigm for Internetworking," Rui Campos, Nadeem Akhtar, Carlos Pinho, Jose Ruela, Manuel Ricardo, Cornelia Kappler, Cornel Pampu, Louise Burness, Philip Eardley, Petteri Poyhonen, Paulo Mendes, Di Zhou, Marian Angeles Callejo Rodriguez, Jorge Andres Colas, Linghang Fan, Laura Feeney Roger Kalden, Pekka Koskela, Gosta Leijonhuvud, Klaus Mossner, Janne Riihijarvi, Morten Schlager, and Brynjar-Age Viken. Proceedings of the 11th WWRF Meeting, Olso, Norway Jun. 2004.

"How to Use a Bluetooth Enabled Cell Phone," Catherine Roseberry, About.com 2009.

"Tethering Solution for Verizon XV6700," Discussion Forum, PDAphoneHome.com, htpp:/pdaphonehome.com/forums.ppc-6700-codes-methods.html, May 14, 2009.

"Pocket PC Phone Reviews—UT Starcom/Verizon XV6700," Lisa Gade, Mobile Tech Review, Jan. 25, 2006.

"Secure Mobile WLAN HotSpot in the Mobile Phone," JoikuSpot 2.30 Whitepaper, Joikusoft Oy Ltd., 2008.

* cited by examiner

METHOD, SYSTEM AND DEVICE FOR INITIATING WIRELESS COMMUNICATION

FIELD OF THE INVENTION

The present invention pertains in general to wireless communication and in particular to aspects of selectively activating predetermined network interfaces for wireless communication.

BACKGROUND

The evolution of mobile communication systems, specifically terrestrial cellular networks, has dramatically increased the availability of wireless data services and their adoption for wireless communication and information exchange. Mobile communication systems operate on licensed spectra, require special equipment, different from that for accessing other wireless networks, and furthermore require subscriptions to corresponding mobile communication system services. This can increase complexity, cost of manufacture and operation, specifically of wireless handsets that can also communicate with other networks or via other interfaces. Costs of acquisition and operation for a user can be further increased because in order to access the Internet from multiple wireless handsets, service providers often require a single subscriber to enter into multiple subscriptions, and to buy and possess multiple mobile communication system access equipment including cellular transceivers, cellular phones and/or cellular network modems, for example. Nevertheless, cellular phones with additional WiFi, Bluetooth, USB and/or other wireless or wired network interfaces are being adopted in increasing numbers worldwide.

The cost for Internet access may be reduced by selectively using network interfaces of mobile communication system handsets depending on network coverage and access to the Internet via other networks. For example, a mobile phone with a cellular and a wireless local area network (WLAN) interfaces ma be configured to switch between using a cellular network and a WLAN access point/hotspot in order to provide data and/or voice services. Finding and maintaining reliable hotspot services from a wireless handset, specifically in unfamiliar territory, however, can prove time-consuming, unreliable and costly. In some eases, hotspot services may not be available at all. Furthermore, operating a WLAN link typically causes increased power consumption which is of concern specifically in battery powered wireless handsets. A power saving solution for a battery powered handset for accessing a WLAN hotspot is disclosed in United States Patent Application Publication No. 2008/0058031 which teaches using a Bluetooth™ connection to find and establish a WLAN connection from the handset to the access point.

Internet access via a mobile communication system may also be provided by tethering wireless handsets. Tethering involves using a wireless handset, which is not configured to communicate with a mobile communication network by itself, in combination with a wireless handset that is so configured and used as a relay for relaying communication to and from the other handset. For example, a notebook may be connected to a mobile phone with a USB cable, Bluetooth™ or WLAN to form a USB, Bluetooth™ or WLAN dialup network for the notebook without the notebook being configured to access the cellular network directly. The operation of multiple network connections, specifically WLAN, during tethering, however, causes increased power consumption which is of concern specifically in battery powered handsets. Tethering furthermore requires adequate configuration of both handsets, and aspects of the configuration left to the user may be both menial and frustrating. There are a number of open and proprietary tethering software solutions including those of TapRoot Systems Inc. and Joikusoft Oy Ltd. This tethering software, however, does not provide benefits other than to facilitate usability of configuration and operation of the wireless handsets for tethering.

Therefore there is a need for a solution that overcomes at least one of the deficiencies in the art.

This background information, is provided to reveal information believed by the applicant to be of possible relevance to the present invention. No admission is necessarily intended, nor should be construed, that any of the preceding information constitutes prior an against the present invention.

SUMMARY OF THE INVENTION

An object of the present invention is to provide a method, system and device for initiating wireless communication. According to an aspect of the present invention there is provided a wireless device configured to relay wireless communication between a computing device and one or more broadband wireless networks, the wireless device comprising: a network interface system configured for communication with a wireless network and the one or more broadband wireless networks; and a control system operatively coupled to the network interface system and configured to control communication between the network interface system and the wireless network, the control system further configured to activate communication with one or more of the broadband wireless networks upon receipt of a predetermined communication from the computing device via the wireless network.

According to another aspect of the present invention there is provided a method for relaying wireless communication between a computing device and one or more broadband wireless networks, the method comprising: activating a wireless network connection between the computing device and a wireless device using a wireless network; providing, by the computing device, a predetermined communication to the wireless device via the wireless network; activating, by the wireless device, communication with one or more broadband wireless networks in response to the predetermined communication.

According to another aspect of the present invention, there is provided a system for wireless communication, the system comprising a computing device configured for communication with a wireless network; and a wireless device configured to relay wireless communication between the computing device and one or more broadband wireless networks, the wireless device including a network interface system configured for communication with the wireless network and the one or more broadband wireless networks; and a control system operatively coupled to the network interface system and configured to control communication between the network interface system and the wireless network, the control system further configured to activate communication with one or more of the broadband wireless networks upon receipt of a predetermined communication from the computing device via the wireless network.

DETAILED DESCRIPTION OF THE INVENTION

Definitions

The term "wireless terminal" is used to refer to a device for analog and/or digital transmission and/or reception of signals for communication purposes via electromagnetic radiation propagating, for example, through vacuum, air, or a generally non-conductive medium to or from another device. A wireless terminal may use signals formatted for communication with one or more wireless networks according to one or more of a number of communication systems including mobile phone networks such as cellular or satellite phone networks, 2G, 3G, GSM, CDMA, WCDMA networks, Municipal Wi-Fi, GPRS, iBurst, WiBro/WiMAX, UMTS-TDD. HSPA, EVDO, LTE, wireless local area networks, WiFi, WiMAX, personal area networks, Bluetooth, Wireless USB, ZigBee, Digital Enhanced Cordless Telecommunications (DECT) or other current or future wireless communication systems. A wireless terminal may be configured in one or more of various forms of handheld/mobile and/or stationary communication, control and/or computing devices such as a meter reader, teller machine, vehicle or goods tracker or theft alarm apparatus, radio, mobile phone, cellular phone, satellite phone, Smartphone, or a personal computer (PC) such as a desktop, notebook, tablet PC, personal digital assistant (PDA), game console, or peripherals such as a printer, camera, pointing device, or other apparatus, for example.

The term "wireless device" is used to refer to a wireless terminal that is configured to provide access to a mobile communication system and one or more other data networks. A wireless device may be configured for mobile or stationary applications.

The term "computing device" is used to refer to a wireless terminal that is configured to provide access to one or more data networks or interfaces other than a mobile communication system. A computing device optionally may be configured to be able to access to a mobile communication system by itself.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Mobile communication systems, for example, the Universal Mobile Telecommunications System (UNITS) and concepts of its envisioned successors or other alternatives, for example, the Long Term Evolution System, have developed to a point where reasonably fast Internet access is poised to become a commodity. Increasing numbers of wireless handsets such as cellular phones or cellular modems, for example, can provide access to data services and/or the Internet via wireless communication systems with improved performance. Furthermore, wireless terminals that can provide data services and Internet access via mobile communication systems and other wireless networks will further facilitate access to the Internet via mobile communication systems.

In this respect, it can be beneficial for users to utilize wireless terminals more efficiently. For example, a wireless terminal, when operated within a suitable mobile communication system, can be configured to provide Internet access to one or more computing devices without the computing devices requiring direct access to the mobile communication system. Respective benefits may include that a user is only required to possess, operate and pay for a single wireless terminal and one corresponding subscription. For example, an adequate Smartphone, which a user may already use for voice and/or video communication, may be further utilized as an access point/hotspot for data services and/or the Internet if provided by the mobile communication system. One or more computing devices can be operatively coupled and thereby tethered to the wireless terminal via a wired or wireless connection. Wireless tethering avoids the use of additional wiring or cabling. For example, tethering via Bluetooth or WiFi, in contrast to tethering via USB, does not require a cable connection between the wireless terminal and the computing device.

Communication with wireless networks in a wireless terminal may be activated only on demand as activating and maintaining communication of a wireless terminal with wireless networks may increase power consumption, irrespective of whether payload data is being carried. This may help reduce energy consumption in battery operated wireless terminals, in general, and specifically in a wireless device.

There is provided a wireless device configured relay wireless communication between a computing device and one or more broadband wireless networks. In this manner the wireless device can act as an access point, hotspot or the like, for the computing device. The wireless device comprises a network interface system configured for communication with a wireless network and one or more broadband wireless networks. The wireless device further includes a control system operatively coupled to the network interface system, wherein the control system is configured to control communication between the network interface system and the wireless network. The control system is further configured to activate communication with one or more of the broadband wireless networks upon receipt of a predetermined communication from the computing device via the wireless network. According to embodiments of the invention, the control system may be configured to relay wireless communication to and from the computing device using one or more of the broadband wireless networks.

The wireless device is configured to provide access to one or more broadband wireless networks, for example a WLAN, cellular network, satellite network, 2G, 3G, GSM, CDMA, WCDMA networks, GPRS, iBust, WiBro, WiMAX, UMTS, UMTS-TDD, HSPA, EVDO, LTE, WiFi, Municipal Wi-Fi or other similar broadband wireless network as would be readily understood by a worker skilled in the art. The wireless device is also configured for communication using a wireless network, having a relatively small area of coverage like a personal area network (PAN), for example Bluetooth, ZigBee, Wireless USB, Digital Enhanced Cordless Telecommunications (DEM) or other similar wireless network as would be readily understood by a worker skilled in the art. According to embodiments of the invention, activation of one or more wireless networks in the wireless device can be characterized by a first power consumption range. In addition, according to embodiments, the activation of one or more broadband wireless networks can be characterized by a second power consumption range, which is greater than the first power consumption range. As such, according to embodiments, power conservation may be enabled as one or more broadband wireless networks are activated upon receipt or delivery of a predetermined communication, for example a request for use.

According to embodiments, the route of networks through which a communication is relayed by the wireless device may be determined by information included in the communication. For example, the wireless network and broadband wireless network may be configured as data packet switched networks to carry a communication in the form of data packets, wherein each data packet includes information about the target device as would be readily understood by a worker skilled in the art. A wireless device and a computing device according to embodiments of the present invention may employ a data packed switched network using Internet Protocol (IP), for example.

Figure 1:
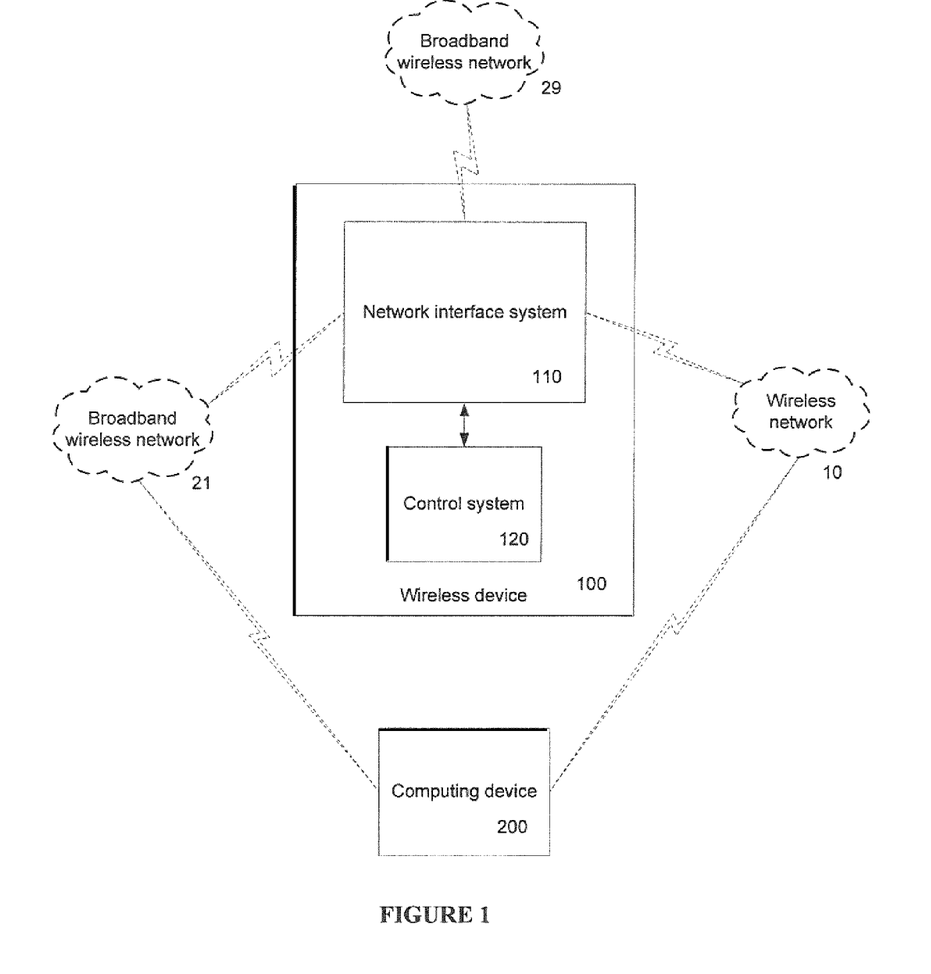
FIG. 1 illustrates a block diagram of a wireless communication system according to embodiments of the invention.

FIG. 1 illustrates a block diagram of a wireless communication system including a wireless device 100 and one computing device 200 according to embodiments of the invention. The system may include more than one computing device (not illustrated). The wireless device comprises a network interface system 110 and a control system 120 operatively coupled to the network interface system 110. The network interface system 110 is configured for communication with a wireless network 10 and one or more broadband wireless networks 21 and/or 29. The control system is further configured to activate communication with one or more of the broadband wireless networks 21 and/or 29 upon receipt of a predetermined communication from the computing device 200 via the wireless network 10, for example a request message submitted by the computing device 200.

According to embodiments of the invention, the wireless device 100 is configured to relay communication between the computing device 200 via the broadband wireless network 21 and one or more of the broadband wireless networks 29 as destined by the respective communication. For example, the wireless device 100, upon receipt of a predetermined communication, can be configured to route traffic within the broadband wireless network 21, which communicatively couples the wireless device and the computing device, irrespective of whether an operative connection to another broadband wireless network, such as broadband wireless network 29 has been activated and/or established. In addition, the wireless device 100, based upon receipt of a predetermined communication over the wireless network 10, can be configured to route traffic between the wireless network 10 and broadband network 29, or between the broadband wireless network 21 and the broadband wireless network 29.

According to embodiments of the invention, the wireless device 100 is configured to relay communication to and from the computing device 200 via the broadband wireless network 21 to and from the broadband wireless network 29 if so destined by the respective communication. For example, the wireless device 100 may be configured to route data packets to and from the computing device 200 via a WiFi connection between the wireless device 100 and the computing device 200 and a UMTS connection between the wireless device 100 and the Internet, wherein broadband wireless network 29 is configured to provide a UMTS network.

According to embodiments of the invention, the wireless device 100 is configured to allow communication with the computing device 200 via a wireless network 10 using one or more authentication schemes. An authentication scheme may comprise a key submission or exchange scheme as used for establishing WEAN. Bluetooth or the like, for example.

According to embodiments, the wireless device 100 may be configured to activate a connection with broadband wireless network 21 and broadband wireless network 29 in response to the predetermined communication. According to some embodiments, the wireless device 100 is configured to activate a connection with broadband wireless network 29, for example, a UMTS network, in response to a predetermined event corresponding in part to the predetermined communication. According to some embodiments, the wireless device 100 is configured to activate a connection with broadband wireless network 29, for example, a UNITS network, in response to a predetermined event which is independent of the predetermined communication, wherein this activation can occur before or after the predetermined communication.

Figure 2:
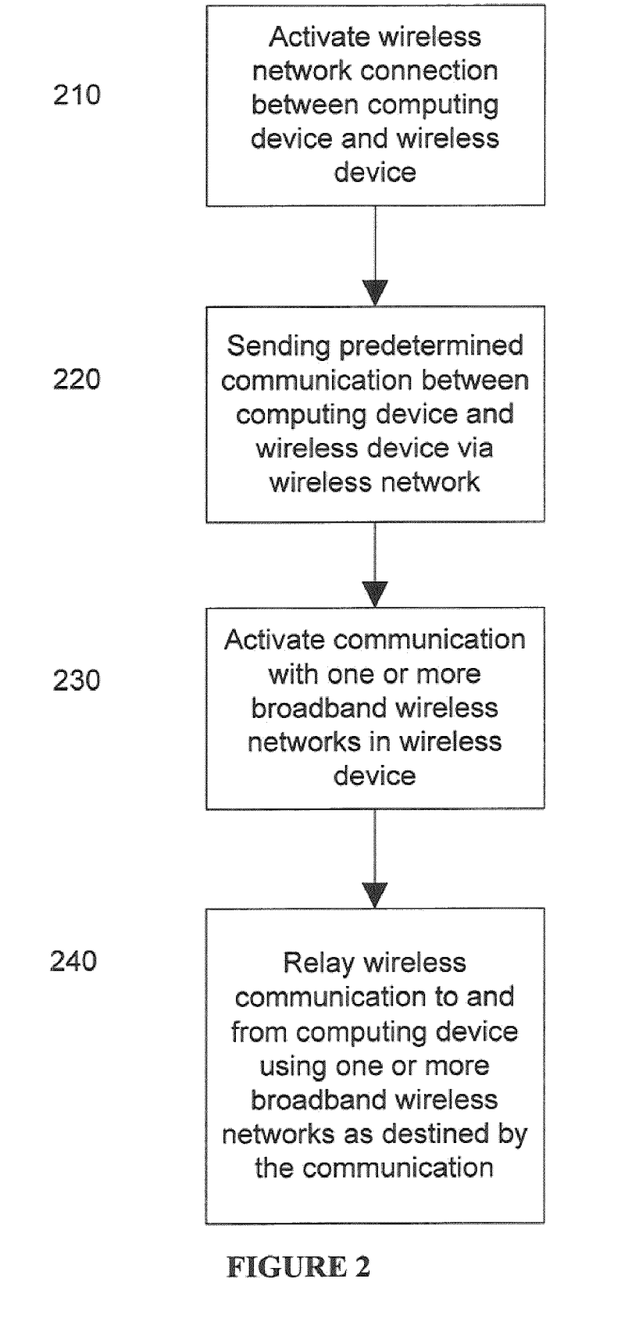
FIG. 2 illustrates a flow diagram of a method for wireless communication according to embodiments of the invention.

FIG. 2 illustrates a flow diagram of a method for selectively activating and relaying wireless communication to and from a computing device 200 using a wireless device 100 according to embodiments of the invention. The method comprises activating a wireless network connection between the computing device and the wireless device using wireless network 210; sending a predetermined communication from the computing device to the wireless device using the wireless network 220 and activating communication with one or more broadband wireless networks in the wireless device in response to the predetermined communication 230.

In some embodiments, the method optionally includes relaying wireless communication to and from the computing device using one or more of the broadband wireless networks as destined by the communication 240. In some embodiments, the method further includes deactivating communication of the wireless device and/or the computing device with the wireless network upon activation of communication with one or more broadband wireless networks (not illustrated).

Network Interface System

The network interface system enables the interconnection of the wireless device and a wireless network and one or more broadband wireless networks. The network interface system may comprise one or more interface subsystems for communication with the wireless network and the one or more broadband wireless networks, for example, one or more of Bluetooth, ZigBee, Wireless USB, WIFi, and/or one or more of the many forms of mobile communication systems networks. The network interface system may additionally comprise interface subsystems for communication with other wireless and/or wired networks. The network interface system may comprise one or more antennas and antenna drive circuitry for wireless communication with the wireless network, the one or more broadband wireless networks and other wireless networks. The network interface system may further comprise one or more electromechanical interfaces and corresponding drive circuitry for wired communication with other devices. The network interface system and/or its interface subsystems may be configured as analog, digital or mixed analog digital systems. Each subsystem may be configured to control one or more interfaces.

Control System

The control system of the wireless device may comprise one or more control subsystems and/or controllers, for example, one or more microcontrollers, microprocessors, central processing units, and/or the like. The control system is configured to perform aspects of controlling the operation of the network interface system and optionally other functions of the wireless device. Aspects of controlling the operation of the network interface system may include activation and deactivation of subsystems or components of and/or control of flow of incoming and/or outgoing communication via the network interface system or other aspects. According to embodiments, aspects of controlling the operation of the network interface system may be controlled in accordance with predetermined schedules, processes, and/or based upon predetermined events and/or communications.

The control system may be configured as analog, digital or mixed analog digital system and comprise one or more stores or memory for storing information, for example, digital data for operation of the control system and/or for control of the network interface system. The control system can be one or a combination of hardware, firmware and/or software and the like. Furthermore, the stores or memory can be flash memory, EPROM, EEPROM, data cache or other type of memory as would be readily understood. One or more of the stores may be configured as buffers for buffering communications received via the network interface. The control system may be configured to buffer and process buffered communications in a predetermined manner, for example, in real time.

A control system according to embodiments of the invention may be configured to engage in and process communication with one or more of the wireless network 10 and the one or more broadband wireless networks. According to the embodiment, the control system of the wireless device may be configured to engage in a predetermined communication with a computing device, and, upon completion of the predetermined communication, configure the network interface system for communication with one or more of the broadband wireless networks.

A control system according to embodiments of the invention may be configured to relay wireless communication to and from one or more computing devices using one or more of the broadband wireless networks as destined by the communication, for example, by operating the wireless device as a router, hotspot or access point for predetermined communications. According to embodiments, the control system may be configured to keep the network interface system activated, for communication with one or more of the broadband wireless networks for a predetermined time, for example, one minute, one hour or another time period typically provided sufficient power is available. The predetermined time may be measured from first activation or last use for communication with one or more of the broadband wireless networks, for example. Optionally, activation of communication with one or more broadband wireless networks can be substantially indefinite, and in this configuration, termination of this connection can be provided by the transmission of predetermined communication, for example a disconnect request or the like over the broadband wireless network or the wireless network. According to embodiments, the control system may be configured to perform routing, port forwarding, masquerading, network address translation, or other form of data packet transformation as part of the relaying of communications.

Predetermined Communication

A predetermined communication is sent from the computing device to the wireless device, and in response to this predetermined communication, the wireless devices activates one or more broadband wireless networks. For example, at first instance, the predetermined communication can be transmitted to the wireless device via a wireless network, for example Bluetooth, ZigBee or the like.

A predetermined communication can be configured as a request message, an activation code, or the like. In some embodiments, a predetermined communication further identifies the specific broadband wireless network with which the wireless device is to activate communication, for example a broadband network for communication between the wireless device and the computing device and/or a broadband wireless network communicatively connected to the Internet or other broadband wireless network with which the wireless device can be communicatively linked.

In some embodiments, transmission of a predetermined communication is initiated directly by a user, for example by the user selecting the transmission of the predetermined communication. In some embodiments, transmission of a predetermined communication is initiated indirectly by a user, for example when a user activates an application on the computing device, which requires use of a broadband wireless network, the computing device automatically sends a predetermined communication to the wireless device for activation of that broadband wireless network. For example, if a user opens a web browser on the computing device, the computing device sends a predetermined communication for the wireless device to activate the broadband wireless network for access to the Internet.

According to embodiments of the invention, a predetermined communication may comprise one or more predetermined events, for example, occurrence of one or more submissions of data packets by the computing device and/or the wireless device. A predetermined communication according to embodiments of the invention may comprise communication associated with one or more of the Open System Interconnection (OSI) Reference Model communication layers. The seven communication layers including the Application Layer, Presentation Layer, Session Layer, Transport Layer, Network Layer, Data Link Layer (including LLC sublayer and MAC sublayer) and the Physical Layer of the OSI Reference Model are readily known in the art.

According to embodiments of the present invention, a predetermined communication may include communications performed during address resolution and/or assignment to a computing device, for example, during determination of an Internet protocol (IP) address using a reverse address resolution protocol (RARP), bootstrap protocol (BOOTP) or a dynamic host configuration protocol (DHCP) or other communication.

A predetermined communication according to some embodiments of the present invention may include submission of an activation request message by the computing device via the wireless network different from a RARP, BOOTP or DHCP IP address determination for the computing device. According to embodiments of the invention, an operative connection between the wireless device and computing device via the wireless network may be used to transfer payload data packets. A broadband wireless communication network coupling the wireless device and computing device can subsequently be activated and used.

The invention will now be described with reference to specific examples. It will be understood that the following examples are intended to describe embodiments of the invention and are not intended to limit, the invention in any way.

EXAMPLES

Example 1

Figure 3:
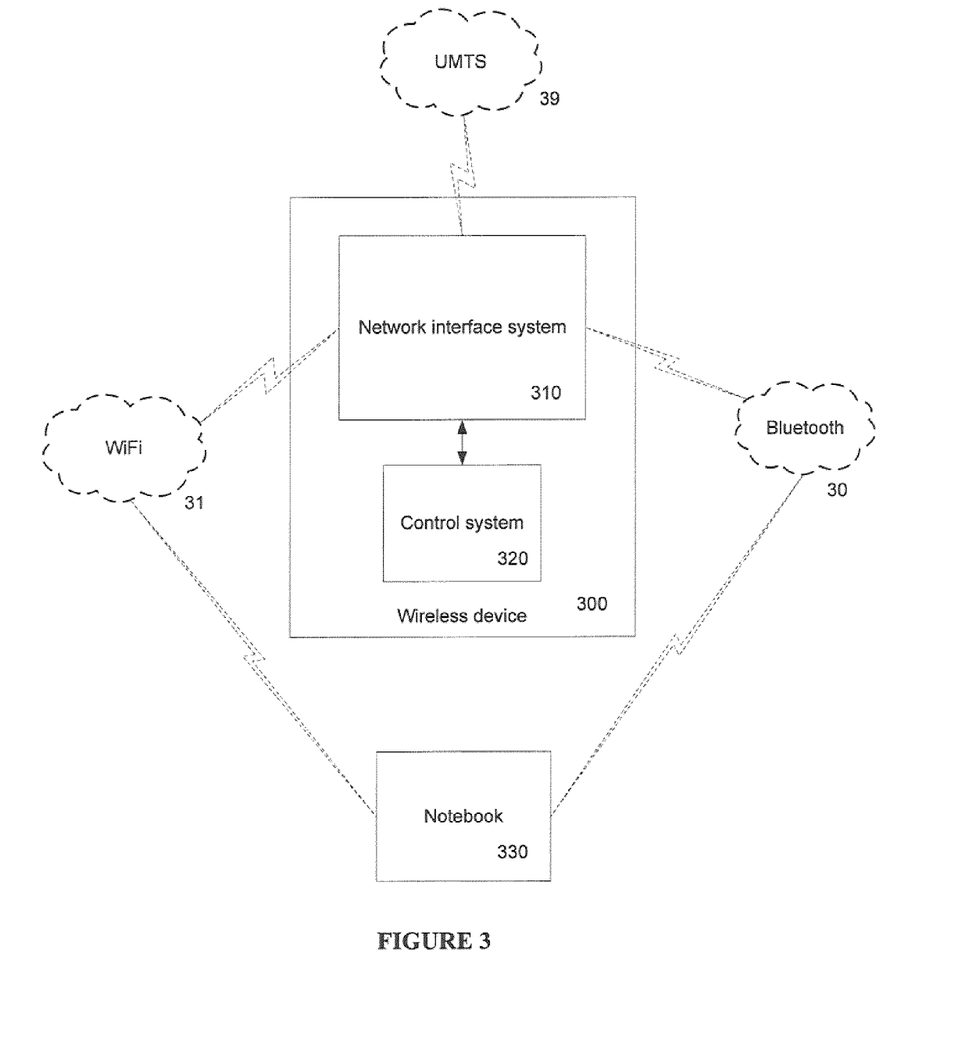
FIG. 3 illustrates a block diagram of a wireless communication system according to embodiments of the invention.

A block diagram of an example wireless communication system according to embodiments of the invention is illustrated in FIG. 3. The system comprises a handset 300 and a notebook 330. Another computing device may be used instead of the notebook 330, as described herein. It is noted that an adequately configured mobile phone may take the place of the notebook 330, for example. The handset 300 and the notebook 330 may be operatively connected via a Bluetooth connection 30 or a WiFi connection 31. The handset 300 may be operatively connected to the Internet via at UMTS connection 39. The handset comprises a control system 320 and a network interface system 310. The network interface system 310 is configured for interconnection with the Bluetooth. WiFi and the UNITS network. The WiFi network may be an IEEE 802.11b/g/n or other WLAN network.

Figure 4:
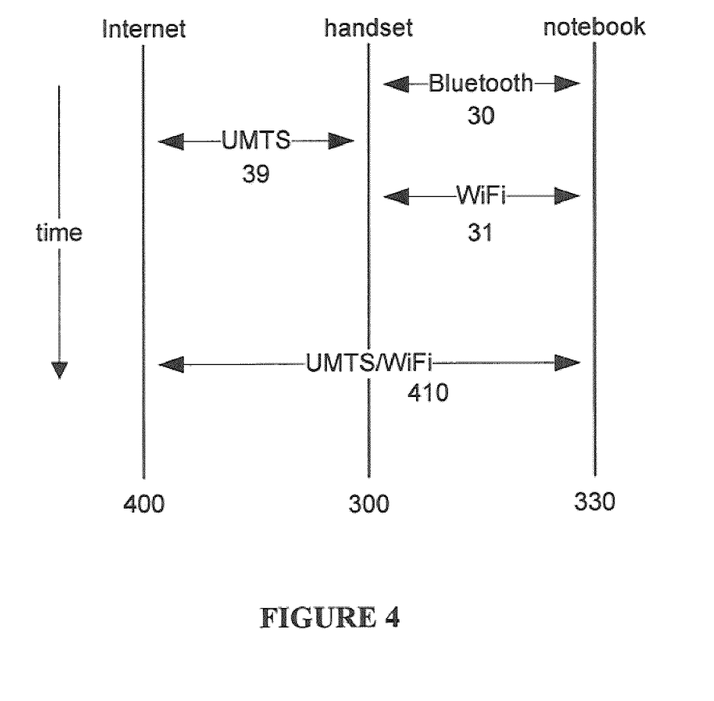
FIG. 4 illustrates a time diagram of established network connections according to embodiments of the invention.

A sequence of network connections between the handset 300, the notebook 330 and the Internet 400 are illustrated in a time diagram in FIG. 4. The handset 300 and the notebook 330 may be manually configured to retain one or more authentication keys for authenticating identity of the notebook 330 and/or the handset 300 when establishing a Bluetooth connection 30 and subsequently use these keys in order to re-establish a Bluetooth connection 30 without requiring re-entering of the corresponding keys. Once Bluetooth keys have been shared, the handset 300 and the notebook 330 may be considered paired and ready for automatic activation of a Bluetooth connection 30. The handset 300 and the notebook 330 may be configured to allow independent activation of their corresponding Bluetooth functions by a user.

The handset 300 may be configured to assume one or more operational conditions. The handset 300 is configured to establish and engage in a predetermined communication with the notebook 330 via the Bluetooth connection 30 upon request by the notebook 330 in one or more of the operational conditions. The notebook may, once a Bluetooth connection with the handset 300 is established, submit a request message requesting activation of an operative connection for communication to the Internet via a UMTS connection 39 of the handset 300. The predetermined communication may furthermore request activation of a WiFi connection between handset 300 and notebook 330 upon activation of the UMTS connection 39. The handset 300 and the notebook 330 may be configured to keep the Bluetooth connection 30 active for a predetermined time or until occurrence of a predetermined event and then deactivate Bluetooth connection 30, for example. The handset 300 may be configured to deactivate one or more components of the network interface system 310 associated with Bluetooth communication upon deactivation of all Bluetooth connections.

The handset 300 may be configured to relay communication between the notebook 330 and the Internet via the WiFi connection 31, as illustrated by reference numeral 410, or the Bluetooth connection 30 (not illustrated) or both the WiFi connection 31 and the Bluetooth connection 30, in combination with the UMTS connection 39, in accordance with address information included in data packets of the corresponding communication. For example, the handset 300 may be configured to perform functions of a router, perform NAT, masquerading or other packet data network functions. Furthermore, the handset 300 may be configured to relay data packets fbr the notebook 330 and one or more other computing devices.

The handset 300 and/or the notebook 330 may be configured to deactivate communication via the WiFi connection 31 after a predetermined period of time or at the occurrence of a predetermined event, for example, one or more predetermined user interactions with the handset 300 or the notebook 330, deactivation requests or the like The handset 300 and/or the notebook 330 may be configured to deactivate communication and respective interface circuitry irrespective of whether the WiFi connection 31 has been used by the handset 300 and/or notebook 330 for transmitting payload data. The handset 300 may be configured to (re)activate communication via Bluetooth network connection 30 upon deactivation of the WiFi connection to be able to receive requests for reactivation, namely one or more predetermined communications, of the WiFi connection.

Example 2

A block diagram of another example wireless communication system according to an embodiment of the present invention is also illustrated in FIG. 3 and comprises components as described above.

Figure 5:
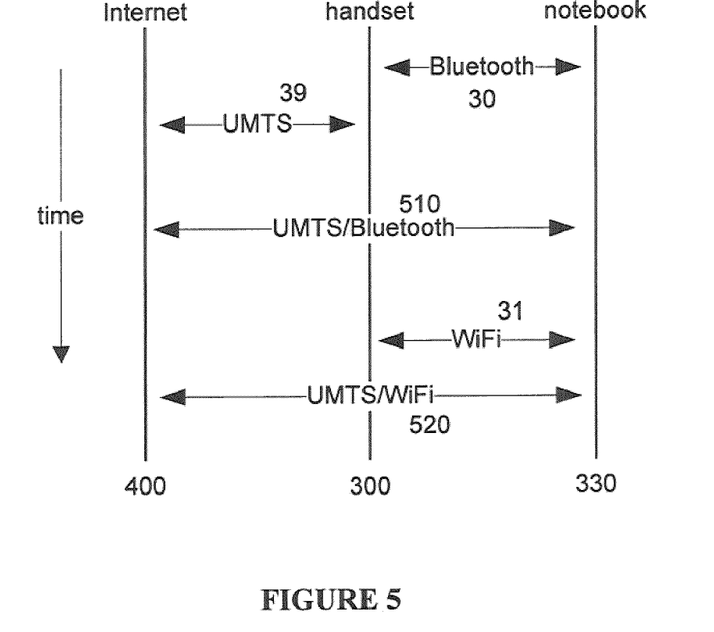
FIG. 5 illustrates a time diagram of established network connections according to embodiments of the invention.

A sequence of network connections between the handset 300, the notebook 330 and the Internet 400 are illustrated in a time diagram in FIG. 5. The handset 300 and the notebook 330 may be manually configured to retain one or more authentication keys for authenticating identity of the notebook 334) and/or the handset 300 when establishing a Bluetooth connection 30 and subsequently use these keys in order to re-establish a Bluetooth connection 30 without requiring reentering of the corresponding keys. Once Bluetooth keys have been shared, the handset 300 and the notebook 330 may be considered paired and ready for automatic activation of a Bluetooth connection 30. The handset 300 and the notebook 330 may be configured to allow independent activation of their corresponding Bluetooth functions by a user.

The handset 300 may be configured to assume one or more operational conditions. The handset 300 is configured to establish and engage in a predetermined communication with the notebook 330 via the Bluetooth connection 30 upon request by the notebook 330 in one or more of the operational conditions. The notebook may, once a Bluetooth connection with the handset 300 is established, submit a request message requesting activation of an operative connection for communication to the Internet via a UMTS connection 39 of the handset 300.

The handset 300 is configured to relay 510 data packets between the notebook 330 and the Internet 409 via the Bluetooth connection 30, or, if a predetermined event occurs, the WiFi connection 31, as illustrated by reference numeral 529, or both the WiFi connection 31 and the Bluetooth connection 30, in combination with the UMTS connection 39. A predetermined event may occur once a predetermined amount of data has been relayed via the Bluetooth connection 39 that warrants activating WiFi connection 31 and switching from or additionally activating relaying 520 communication via Bluetooth connection 30 to WiFi connection 31. The handset 300 and the notebook 330 may be configured to relay communication via both WiFi connection 31 and the Bluetooth connection 30.

In order to establish the WiFi connection 31, the handset 300 may notify the notebook 330, upon activation of the network interface system 310 for a WiFi connection, by submitting for receipt by the notebook 330 a WiFi activation message via Bluetooth connection 30, in response to which, the notebook 330 can establish the WiFi connection with the handset 300.

The handset 390 and the notebook 330 may be configured to keep the Bluetooth connection 30 active for a predetermined time or until occurrence of a predetermined event and then deactivate Bluetooth connection 30, for example. The handset 300 may be configured to deactivate one or more components of the network interface system 310 upon deactivation of all Bluetooth connections.

The handset 300 and/or the notebook 330 may be configured to deactivate communication via the WiFi connection 31 after a predetermined period of time or at the occurrence of a predetermined event, for example, when the payload data rate of relayed communications drops below a predetermined level. The handset 300 and/or the notebook 330 may be configured to deactivate Win connection 31 and respective interface circuitry in the handset 300 and the notebook 330 in a controlled manner.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A wireless device configured to relay wireless communication between a computing device and one or more broadband wireless networks, the wireless device comprising:
   a) a network interface system configured for communication with a wireless network and the one or more broadband wireless networks, wherein communication with the wireless network is characterized by a lower power consumption than communication with the one or more broadband wireless networks; and
   b) a control system operatively coupled to the network interface system and configured to control communication between the network interface system and the wireless network, the control system further configured to activate communication with one or more of the broadband wireless networks upon receipt of a predetermined communication from the computing device via the wireless network.

2. The wireless device according to claim 1, wherein a first broadband wireless network is a cellular network, satellite network, UMTS network, 2G network, 3G network, GSM network, CDMA network, WCDMA network, GPRS network, iBurst network, WiBro network, WiMAX network, UMTS-TDD network, HSPA network, EVDO network or LTE network.

3. The wireless device according to claim 2, wherein a second broadband wireless network is a WiFi network or a WLAN network, said second broadband wireless network communicatively linking the computing device and the wireless device.

4. The wireless device according to claim 3, wherein the first broadband wireless network is activated prior to the second broadband wireless network.

5. The wireless device according to claim 3, wherein the second broadband wireless network is activated prior to the first broadband wireless network.

6. The wireless device according to claim 1, wherein the wireless network is a personal area network (PAN), Bluetooth network, ZigBee network, Wireless USB network, Digital Enhanced Cordless Telecommunications (DECT) network.

7. The wireless device according to claim 1, wherein one or more of the wireless network and the broadband wireless networks are configured as a packet switched network.

8. The wireless device according to claim 7, wherein the control system is further configured to perform one or of routing, port forwarding, masquerading and network address translation.

9. The wireless device according to claim 1, wherein the predetermined communication is configured as a request message or an activation code.

10. The wireless device according to claim 1, wherein a user of the computing device directly or indirectly initiates transmission of the predetermined communication.

11. A method for relaying wireless communication between a computing device and one or more broadband wireless networks, the method comprising:
   a) activating a wireless network connection between the computing device and a wireless device using a wireless network, wherein the wireless network connection is characterized by a lower power consumption than communication with the one or more broadband wireless networks;
   b) providing, by the computing device, a predetermined communication to the wireless device via the wireless network;
   c) activating, by the wireless device, communication with one or more of the broadband wireless networks in response to the predetermined communication.

12. The method according to claim 11, wherein a first broadband wireless network is a cellular network, satellite network, UMTS network, 2G network, 3G network, GSM network, CDMA network, WCDMA network, GPRS network, iBurst network, WiBro network, WiMAX network, UMTS-TDD network, HSPA network, EVDO network or LTE network.

13. The method according to claim 12, wherein a second broadband wireless network is a WiFi network or a WLAN network, said second broadband wireless network communicatively linking the computing device and the wireless device.

14. The method according to claim 13, wherein activating communication includes activating the first broadband wireless network prior to activating the second broadband wireless network.

15. The method according to claim 13, wherein activating communication includes activating the second broadband wireless network prior to activating the first broadband wireless network.

16. The method according to claim 11, wherein the wireless network is a personal area network (PAN), Bluetooth network, ZigBee network, Wireless USB network, Digital Enhanced Cordless Telecommunications (DECT) network.

17. The method according to claim 11, wherein the predetermined communication is configured as a request message or an activation code.

18. The method according to claim 11, wherein a user of the computing device directly or indirectly initiates providing the predetermined communication.

19. A system for wireless communication, the system comprising:
   a) a computing device configured for communication with a wireless network; and
   b) a wireless device configured to relay wireless communication between the computing device and one or more broadband wireless networks, the wireless device including:
      i) a network interface system configured for communication with the wireless network and the one or more broadband wireless networks, wherein communication with the wireless network is characterized by a lower power consumption than communication with the one or more broadband wireless networks; and
      ii) a control system operatively coupled to the network interface system and configured to control communication between the network interface system and the wireless network, the control system further configured to activate communication with one or more of the broadband wireless networks upon receipt of a predetermined communication from the computing device via the wireless network.

20. The system for wireless communication according to claim 19, wherein a first broadband wireless network is a cellular network, satellite network, UMTS network, 2G network. 3G network, GSM network, COMA network, WCDMA network, GPRS network, iBurst network, WiBro network, WiMAX network, UMTS-TDD network, HSPA network, EVDO network or LTE network and wherein a second broadband wireless network is a WiFi network or a WLAN network, said second broadband wireless network communicatively linking the computing device and the wireless device.

21. The system for wireless communication according to claim 20, wherein the first broadband wireless network is activated prior to the second broadband wireless network.

22. The system for wireless communication according to claim 20, wherein the second broadband wireless network is activated prior to the first broadband wireless network.

23. The system according to claim 19, wherein the wireless network is a personal area network (PAN), Bluetooth network, ZigBee network, Wireless USB network, Digital Enhanced Cordless Telecommunications (DECT) network.

24. The system for wireless communication according to claim 19, wherein the predetermined communication is configured as a request message or an activation code.

25. The system for wireless communication according to claim 19, wherein a user of the computing device directly or indirectly initiates sending of the predetermined communication.

* * * * *